Dec. 25, 1956 — J. D. STROBELL — 2,775,186
VENTILATING APPARATUS
Filed May 19, 1953 — 2 Sheets-Sheet 1

INVENTOR.
John Dixon Strobell
BY Watson Johnson Leavenworth & Blair
ATTORNEYS

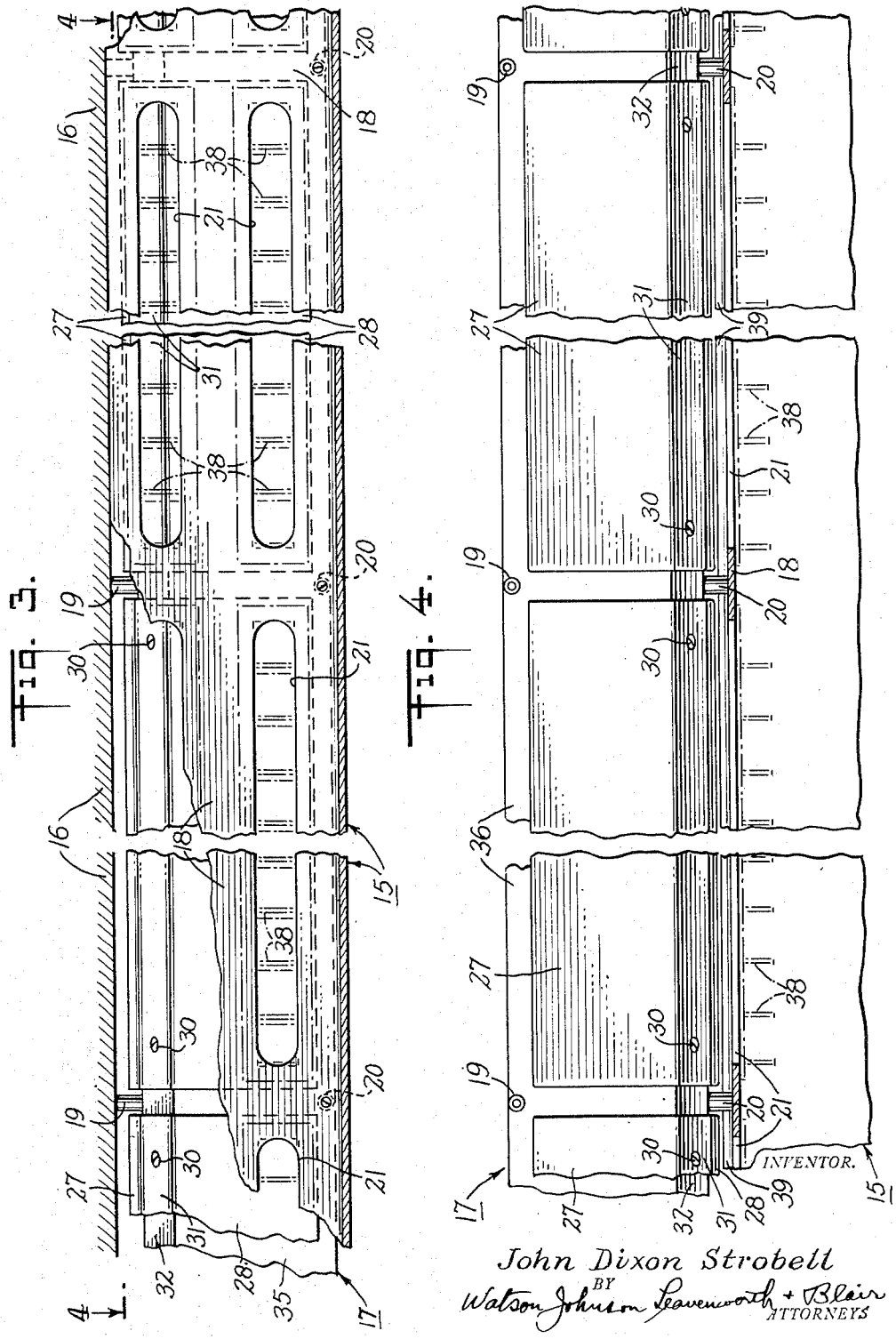

United States Patent Office 2,775,186
Patented Dec. 25, 1956

2,775,186

VENTILATING APPARATUS

John D. Strobell, New Haven, Conn., assignor to The Safety Car Heating and Lighting Company, Inc., New Haven, Conn., a corporation of Delaware Application May 19, 1953, Serial No. 356,048

12 Claims. (Cl. 98—14)

This invention relates to improvements in ventilating apparatus, and more particularly to an improved combination of air-conditioning duct and lighting fixture for occupied enclosures. A preferred embodiment of the invention is particularly adapted to the distribution of conditioned air in railway passenger cars and the lighting thereof.

In recent years railroads have placed in service a double-decker type of passenger car known as a "dome car," having both an upper and a lower level for passenger accommodation. The upper level of these cars is usually covered over with a transparent roof of substantially all-glass construction which may extend over the entire length of the car, or in some cases only over a lesser portion thereof. These cars present a greater air-conditioning problem than the older single-deck type of coach, not only because of the added passenger load resulting from the increased seating capacity but particularly because of the high absorption of heat radiation from the sun's rays which pass unobstructedly through the dome. Also, physical limitations imposed by the construction of the dome, the low headroom and the desire to provide as much visual area as possible, create additional problems in providing means for adequate air distribution.

Heretofore the practice of air-conditioning such cars has been by means of a shallow rectangular duct secured to the crest of the dome and extending longitudinally over the center aisle of the upper deck. Air is distributed through perforations in the bottom plate of this duct. The necessarily small dimensions of the duct, due to limited headroom, result in undesirably high air velocities of the volume of air circulated. A correspondingly high static pressure is also required within the duct to obtain sufficient flow through the perforated plate outlets.

Air-conditioning by this prior art means has been unsatisfactory because the higher resistance of the air circulation system reduces the total quantity of available air below that required for the cooling load, and also because most of the air, which is discharged through the perforations in the bottom of the duct, travels vertically downward through the aisle passageway where it then flows along the aisle until it reaches the lower level of the car and passes into the evaporator unit to be cooled and recirculated. Thus, it is apparent that with this prior system very little of the air flows through the regions of the dome to either side of the aisle where the passengers are seated, and virtually none of the air circulates along the window seats where the heat absorption from the sun's rays is the greatest.

One of the objects of the present invention is to provide improved air distribution and ventilating means for occupied enclosures, such as dome cars, which minimizes or eliminates these prior art difficulties and whereby a greater volume of conditioned air is selectively distributed and caused to circulate in the occupied areas of the car.

Another object of the invention is to provide air distribution means of compact physical dimensions capable of effectively distributing relatively large volumes of air without developing excessive internal static pressures.

Another object of the invention is to provide an improved structure in which an air distribution duct is combined with electrical lighting fixtures in a unique manner.

A further object of the invention is to provide a structural embodiment of the invention which is readily constructed and permits efficient use and operation thereof.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which.

Figure 2:
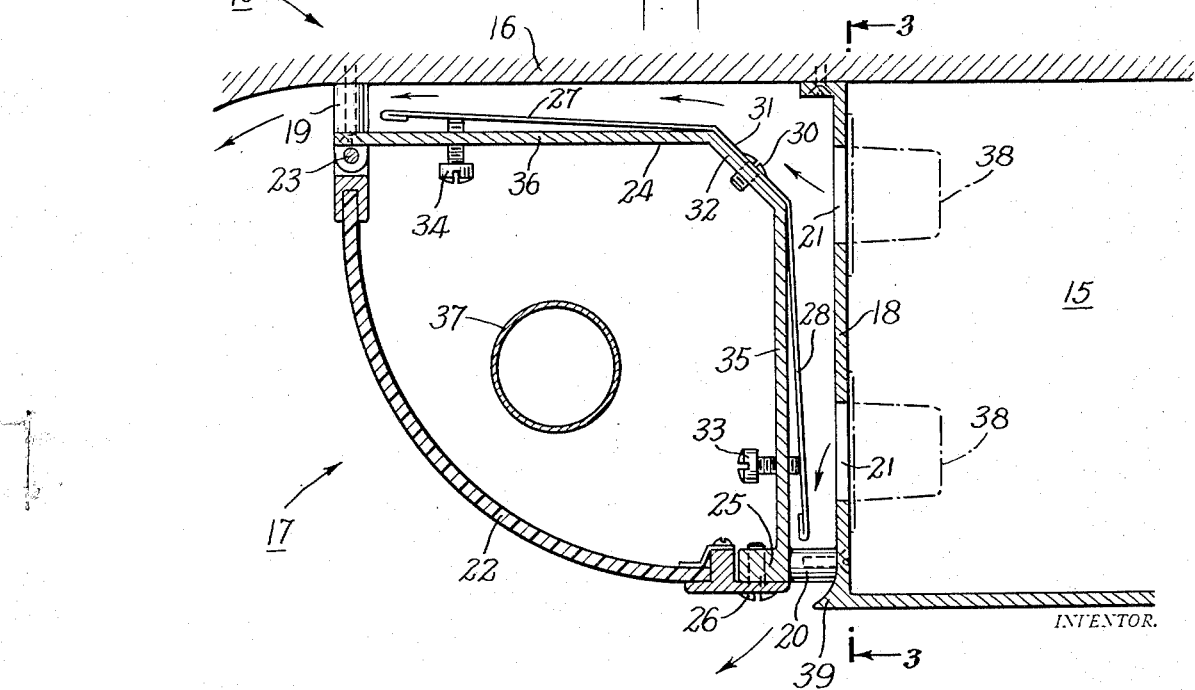
Fig. 2 is a detailed sectional view of one side of the ceiling structure of Fig. 1, with parts broken away, showing a portion of the air-conditioning duct with associated lighting fixture structure.

Fig. 3 is a longitudinal sectional view to reduced scale of the air-conditioning duct taken along the line 3—3 of Fig. 2, partially broken away to show associated damper structure; and Fig. 4 is a longitudinal section, with parts broken away, taken substantially along line 4—4 of Fig. 3 showing the relationship of the damper structure to the duct vents, and also illustrating a plurality of air foil or baffle plates which may be mounted in the duct adjacent its side wall openings.

Figure 1:
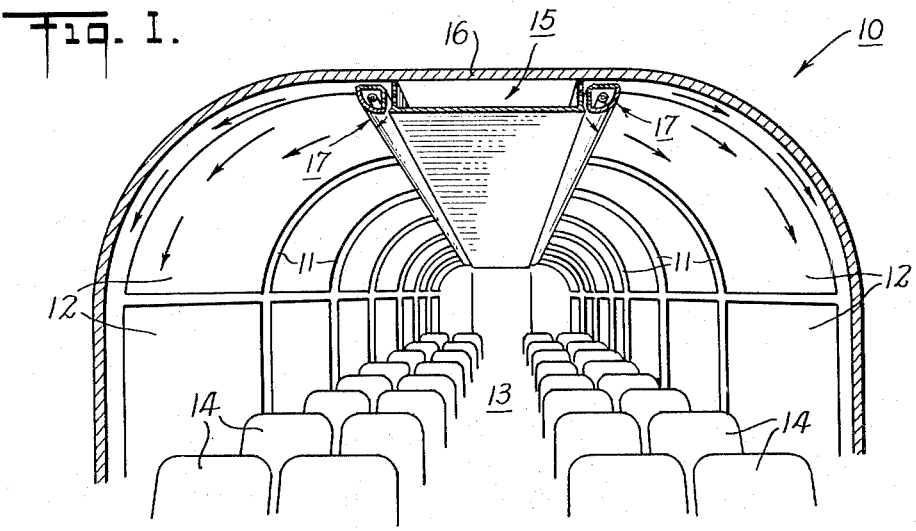
Fig. 1 is a general perspective view, with parts broken away and in sections, of the interior of the dome portion of a dome car, showing an embodiment of the ventilating and illuminating structure of the present invention installed in the center dome thereof.

Referring now in greater detail to the drawings, in which like numerals identify similar parts throughout, it will be seen that the structure indicated generally at 10 in Fig. 1 represents the interior of the dome portion of a dome-type railway passenger car in which arched rib members 11 support large transparent dome and window panels 12. These transparent panels are usually of shatter-proof glass, although they may be formed of transparent plastic. Arranged in parallel rows on either side of the center aisle 13 are seats 14—14 for the accommodation of passengers. Above the aisle is an air-conditioning duct 15, comprising a trough of substantially rectangular cross-section, suspended from the center of the ceiling or roof 16 of the dome and extending longitudinally the length of the car. On either side of the air distribution duct 15 are longitudinally extending lighting fixture assemblies 17—17 mounted in the corners formed between the vertical side walls of the duct 15 and the ceiling 16 of the car dome.

As may be seen more clearly from the detailed cross-sectional view of Fig. 2, each lighting fixture assembly 17, hereinafter termed a "lighting fixture," is spaced from the ceiling 16 and from the vertical side wall 18 of the air distribution duct by means of mounting bosses 19 and 20. Each fixture 17 is rigidly attached to both the ceiling 16 and the vertical wall 18 by means of a plurality of these spacing bosses, such as 19 and 20, which may be mounted at regularly spaced intervals along the entire length of the fixture, and the latter may, if desired, be built up as aligned sections.

In the adjacent vertical side wall 18 of the air distribution duct are formed a plurality of discharge openings 21—21, which in the preferred embodiment may be provided as a pair of parallel rows of aligned slots extending longitudinally of the duct, with one row in proximity to the top of the side wall 18 and the other row located near the bottom of this side wall. It is not essential, however, that these discharge openings be slots, and, for example, they may be any desired number of rows of holes of circular or other configuration.

As seen in Fig. 2 of the drawing, the fixture 17 may comprise a light-transmitting cover portion 22, which is preferably in the form of an arched or curved wall of translucent material, such as a quarter section of a plastic cylinder, attached along one edge by hinge means 23 to one edge of a substantially right angular casing trough 24 of metal or other suitable material. The cover 22 is fastened at its opposite edge to a flanged portion 25 of the casing 24 by a plurality of machine screws or other removable fastenings 26.

Attached to the back side of the lighting fixture casing 24 are adjustable dampers 27 and 28 which extend within the lateral and downwardly extending spaces respectively formed between the casing 24 and the ceiling 16, and between the casing 24 and the duct wall 18, respectively. These dampers 27 and 28 may conveniently be formed as marginal sections of a single strip of resilient sheet metal, or a plurality of aligned strips, bent to conform to the outer contour of the fixture casing 24 and secured to the outer side thereof by machine screws 30—30 which hold the central zone 31 of the sheet metal damper strip firmly against a truncated or mitered corner 32 of the casing as seen in the drawing of Fig. 2. If desired, this corner 32 of the casing 24 may be curved or rounded, or of any other suitable shape, rather than mitered, and preferably serves to divert or funnel air flow from upper discharge openings 21—21 through the lateral space between the ceiling 16 and the top of the casing 24. Adjusting screws 33—33 and 34—34, respectively threaded through tapped holes in the walls 35 and 36 of the casing 24 abut the inner sides of damper sections 27 and 28 and afford a means of varying the position of each damper section individually. Other adjusting means than machine screws may be employed for this purpose if desired.

Light sources may be in the form of fluorescent or incandescent illuminating tubes extending longitudinally within the casing 24, as is indicated at 37 in Fig. 2, and supported in a proper position by any suitable electrical supporting brackets (not shown), a number of different styles of which are available commercially.

Baffles or air foils may be provided on the innerside of the air duct vertical side wall 18 adjacent to and/or across the air vent openings 21—21, for example in the form of laterally-extending or normal flanges 38—38 as shown in dotted lines in Figs. 2, 3 and 4. When so mounted these air foil or baffle plates 38—38 serve to divert a portion of the air flowing longitudinally through the duct 15, so as to direct a greater volume of air through the side wall openings 21—21. Such air foils 38—38, known as "snatches," may or may not be required depending upon the overall length of the air duct and the air velocities and static pressures present in any given installation. Such means for diverting additional air flow through the side openings may be required when the internal static pressure at the openings is relatively low with respect to the air velocity through the duct.

By reference to Fig. 3 of the drawings, the relative longitudinal dimensions of the air duct side wall openings 21—21 and their associated damper plates 27 and 28 in a typical installation, may be seen. In the preferred embodiment of the invention the length of each of the longitudinal discharge slots or openings 21—21 approximately corresponds to the spacing between seats of the railway car in which the system is installed. The longitudinal dimension of each of the damper plate strip sections 28—28 preferably exceeds the length of each of the discharge openings 21—21 so that when one of these damper sections is closed it will substantially cover the adjacent opening. If desired, the length of the discharge slots 21—21 and the aligned damper strips may be selected to approximately coincide with the length of the illuminating tubes installed in the lighting fixture casing 24, and the latter need not be continuous as previously indicated but may consist of a plurality of aligned spaced or adjacent sections. Further, the ends of the plurality of damper strips may, if desired, be juxtaposed rather than spaced as shown. Although the plurality of air foil snatch plates 38—38 may be disposed substantially normal to duct side wall 18 and thus at right angles to the path of air flow longitudinally through the duct 15, as shown in Fig. 4, they may be set at other angles so as to divert either a greater or lesser volume of air flow through the side wall openings 21—21; or they may be omitted, if desired.

The manner in which the structure of the invention may be operated to provide a more uniform or desired distribution of air throughout the occupied regions of the enclosure in which it is installed is clearly illustrated by Fig. 1 and Fig. 2. It will there be seen that a portion of the air discharged through the side wall openings 21—21, more particularly the top bank thereof, passes over the top wall 36 of the lighting fixture casing 24, and top damper 27, and is directed laterally along and adjacent to the curved ceiling 16 of the car dome where it absorbs much of the radiated heat and thereby cools and ventilates the region occupied by the window seats. The shaping of the casing and damper strips respectively at 32 and 31 direct and facilitate this lateral flow. Another portion of the air emanating from the openings 21—21 in the duct side wall 18, more particularly the lower bank thereof, is diverted downwardly along damper 28 through the space between the lighting fixture wall 35 and the air duct wall so as to be generally directed onto the rows of seats adjacent to the center aisle 13. A flip or curved baffle flange 39 at the bottom exterior corner of the duct 15 helps to divert this portion of the air stream from the car aisle 13 and directs the downward air flow more surely onto the aisle seats.

When the system is initially installed in a railway car the desired distribution of air flow is obtained by adjusting the several dampers, such as 27 and 28, along the entire length of the ventilation duct 15. Access to the adjusting screws 33—33 and 34—34 is gained by opening the hinged translucent cover 22. By turning these adjusting screws the positions of the damper plates 27 and 28 may be varied to increase or decrease the width of the air passages between the casing top wall 36 and the dome ceiling 16, or between the casing side wall 35 and the side wall 18 of the air duct, so as to vary the air flow through either or both of the discharge passages. Once these dampers have been properly set they should ordinarily require no further adjustment, unless it may be desired subsequently to change the air distribution pattern.

It is to be understood that in accordance with the present invention the adjustment of the air flow distribution may be attained by the use of damper means located only in one of the discharge passages, as for example in the downwardly-directed discharge passage defined between the duct wall 18 and the fixture casing wall 35, such damper means tending, when restricting the flow of air through that passage, to cause some of the air flowing from the discharge openings 21—21 to take a path of lesser resistance upward and over the fixture top wall 36 in the event the lateral top passage is more open. Such diversion thus will occur either when the top damper 27 causes little or no constriction of the lateral top passage between the fixture top wall 36 and the ceiling 16 or when it is omitted entirely therefrom, and with the downwardly-directed passage being more resistant to flow, either by virtue of the relative cross-sectional dimensions of the two passages or by flow-restricting adjustment of damper means in the downwardly-directed passage.

The air distribution system of the invention is simple and economical in construction, easy to adjust and maintain, unobtrusive and neat in appearance, provides very inconspicuous discharge openings, and occupies a minimum of overhead space. By means of this invention a more uniform distribution of conditioned air may be obtained, as well as effective uniform illumination, especially in enclosures where available headroom is quite limited.

It will thus be seen that the objects set forth above, among those made apparent from the preceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a railway car air-conditioning system an overhead lateral air supply duct suspended adjacent the ceiling of a railway car and having a pair of downwardly extending opposed side walls; upper and lower discharge outlets in said side walls, internal baffle means within said duct for diverting air flow therethrough into said outlets, external air flow diverting means comprising a pair of elongated illuminating fixture structures adjacent to but spaced from said duct side walls and said car ceiling, each of said fixture structures comprising a pair of angularly disposed top and side casing walls, said top casing walls laterally extending below and spaced from said car ceiling to define therebetween lateral discharge passages substantially contiguous with at least some of said upper discharge outlets, mitered corner junctures of said top and side casing walls constituting with said car ceiling funnels for directing air flow from said upper discharge outlets to said lateral air discharge passages, said side casing walls downwardly extending from said corner junctures opposite to at least some of said lower discharge outlets and laterally spaced from said duct side walls and said lower outlets to define therebetween downwardly directed air discharge passages, adjustable damper means on said casing walls and extending into said lateral and downward discharge passages, illuminating means between said top and side casing walls for emitting light rays downwardly and outwardly from within the angle formed by said walls, and removable translucent cover means extending between said top and side casing walls to substantially enclose said illuminating means.

2. In ventilating apparatus for railroad cars or the like, the combination of an overhead longitudinal air supply duct mounted adjacent to and extending downward from a car ceiling and having laterally spaced side walls with at least two longitudinally disposed discharge openings in said side walls spaced one above the other, deflecting plates mounted below and spaced from said ceiling and mounted beside but laterally spaced from said side wall to define therebetween laterally and downwardly extending passages respectively, whereby air from the duct is directed in a sweeping path along the ceiling and down by the windows of the car and also in a downward direction generally toward the aisle of the car and adjustable dampers in said passages for adjusting the air flow therein.

3. In ventilating apparatus for a railroad car or the like wherein elongated lighting fixtures having a top plate and a side plate are suspended from the ceiling thereof, the combination of an overhead longitudinal air supply duct mounted adjacent to and extending downwardly from a car ceiling, said duct having laterally spaced side walls, with longitudinally disposed discharge openings in said side walls spaced one above the other, said lighting fixtures being mounted alongside but spaced from said duct whereby the side plate of said fixtures and the side walls of said duct form downwardly directed passages for diverting the air flow from said openings, and said lighting fixtures being mounted adjacent to but spaced from the ceiling of said car whereby said ceiling and the top plate of said lighting fixtures form laterally directed passages for directing the air flow from said openings along the ceiling and down by the windows of the car.

4. In ventilating apparatus for railroad cars or the like the combination of a centrally located overhead longitudinal air supply duct mounted adjacent to and extending down from a car ceiling having spaced side walls, with longitudinally disposed discharge openings in said side walls spaced one above the other and flow diverting structures comprising a top plate and a side plate disposed at an angle to said top plate, said structures being mounted adjacent but spaced from the side wall of said duct, to form downwardly directed passages therebetween whereby air emerging from said duct through said discharge openings is directed in a downward direction generally toward the aisle of the car and said structures being spaced from the ceiling of said car to form laterally directed discharge passages therebetween, whereby air emerging from said duct through said discharge openings is directed in a sweeping path along the ceiling and down by the windows of the car.

5. The combination defined in claim 4 in which the plates of the flow diverting structure are at right angles to each other.

6. In ventilating apparatus for railroad cars or the like the combination of an overhead longitudinal air supply duct mounted adjacent to and extending down from a car ceiling having spaced side walls, with longitudinally disposed discharge openings in said side walls spaced one above the other, flow diverting structures comprising a top plate and a side plate disposed at an angle to said top plate, said structures being mounted adjacent but spaced from the side wall of said duct, to form downwardly directed passages therebetween whereby air emerging from said duct through said discharge openings is directed in a downward direction generally toward the aisle of the car and said structures being secured to but spaced from the ceiling of said car to form laterally directed discharge passages therebetween, whereby air emerging from said duct through said discharge openings is directed in a sweeping path along the ceiling and down by the windows of the car and adjustable dampers in each of said passages for adjusting the air flow therein.

7. In ventilating apparatus for railroad cars or the like the combination of an overhead longitudinal air supply duct mounted adjacent to and extending down from a car ceiling having spaced side walls, with longitudinally disposed discharge openings in said side walls spaced one above the other and flow diverting structures comprising a top plate and a side plate disposed at an angle to said top plate, said structures being mounted adjacent but spaced from the side wall of said duct to form downwardly directed passages therebetween whereby air from the duct is directed in a downward direction generally toward the aisle of the car and said structures being secured to but spaced from the ceiling of said car to form laterally directed discharge passages therebetween, whereby air from the duct is directed in a sweeping path along the ceiling and down by the windows of the car, the juncture of said top plate and said side plate being rounded and constituting with said car ceiling a funnel for directing air from the upper of said discharge openings into said laterally directed discharge passage.

8. In ventilating apparatus for railroad cars or the like the combination of an overhead longitudinal air supply duct mounted adjacent to and extending down from a car ceiling having spaced side walls, with longitudinally disposed discharge openings in said side walls spaced one above the other and flow diverting structures comprising a top plate and a side plate disposed at an angle to said top plate, said structures being mounted adjacent but spaced from the side wall of said duct, to form downwardly directed passages therebetween whereby air from the duct is directed in a downward direction generally toward the aisle of the car and said structure being secured to but spaced from the ceiling of said car to form laterally directed discharge passages therebetween, whereby air from the duct is directed in a sweeping path along the ceiling and down by the windows of the car, the juncture of said top plate and said side plate being mitred and constituting with said car ceiling a funnel for directing the air flow from the upper of said discharge openings into said laterally directed discharge passage.

9. In ventilating apparatus for railroad cars or the like, the combination of a centrally located overhead longitudinal air supply duct mounted adjacent to and extending down from a car ceiling having spaced side walls, with longitudinally disposed discharge openings in said side walls spaced one above the other, internal baffle means within said duct for diverting air through said discharge openings and flow diverting structures comprising a top plate and a side plate disposed at an angle to said top plate, said structures being mounted adjacent to but spaced from the side wall of said duct to form downwardly directed passages therebetween, whereby air emerging from said duct through said discharge openings is directed in a downward direction generally toward the aisle of the car, and said structures being secured to but spaced from the ceiling of said car to form laterally directed discharge passages therebetween, whereby air emerging from said duct through said discharge openings is directed in a sweeping path along the ceiling and down by the windows of the car.

10. In ventilating apparatus for railroad cars or the like, the combination of an overhead longitudinal air supply duct mounted adjacent to and extending down from a car ceiling having spaced side walls, with longitudinally disposed discharge openings in said side walls spaced one above the other, flow diverting structures comprising a top plate and a side plate disposed at an angle to said top plate, said structures being mounted adjacent but spaced from the side wall of said duct, to form downwardly directed passages therebetween whereby air from the duct is directed in a downward direction generally toward the aisle of the car and said structures being secured to but spaced from the ceiling of said car to form laterally directed discharge passages therebetween, whereby air from the duct is directed in a sweeping path along the ceiling and down by the windows of the car, adjustable dampers in said passages for adjusting the air flow therein comprising a plurality of strips of resilient sheet metal bent to conform to the contour of said flow diverting structures, said strips being secured to said structure at the juncture of said top and side plates and means for individually varying the position of the damper strips in the air directing passages.

11. In ventilating apparatus for railroad cars or the like, the combination of an overhead longtiudinal air supply duct mounted adjacent to and extending down from a car ceiling having spaced side walls, with longitudinally disposed discharge openings in said side walls spaced one above the other, flow diverting structures comprising a top plate and a side plate disposed at an angle to said top plate, said structures being mounted adjacent but spaced from the side wall of said duct, to form downwardly directed passages therebetween whereby air from the duct is directed in a downward direction generally toward the aisle of the car and said structures being secured to but spaced from the ceiling of said car to form laterally directed discharge passages therebetween, whereby air from the duct is directed in a sweeping path along the ceiling and down by the windows of the car, dampers in said passages for adjusting the air flow therein formed from a longitudinal resilient strip of sheet metal bent to conform to the contour of said flow diverting structure the central portion of said strip being secured to said structure at the mitred juncture of the top and side plates thereof, and the edges of said strip extending into the air directing passages to form therein the dampers, and means for adjusting the angle between said top and side plates and said strip edges, to individually adjust the air flow in said air direction passages.

12. In ventilating apparatus for railroad cars or the like, the combination of a centrally located overhead longitudinal air supply duct mounted adjacent to and extending down from a car ceiling and having spaced side walls, with longitudinally disposed discharge openings in said side walls spaced one above the other and flow diverting structures comprising a top plate and a side plate disposed at an angle to said top plate, said structures being mounted adjacent but spaced from the side walls of said duct to form downwardly directed passages therebetween whereby air emerging from said lower discharge openings is directed in a downward direction generally toward the aisle of the car, said structures being spaced from the ceiling of said car to form laterally directed discharge passages therebetween, and air directing means to direct a portion of the air from the upper discharge outlet through said laterally directed passages and then in a sweeping path along the ceiling and down by the windows of said car.

References Cited in the file of this patent

UNITED STATES PATENTS

| | | |
|---|---|---|
| 1,597,588 | Fairbanks | Aug. 24, 1926 |
| 1,981,633 | Ragsdale | Nov. 20, 1934 |
| 2,033,069 | Hagen et al. | Mar. 3, 1936 |
| 2,080,960 | Dreyfuss | May 18, 1937 |
| 2,145,222 | Gunter | Jan. 24, 1939 |
| 2,220,587 | Strobell | Nov. 5, 1940 |
| 2,269,795 | Stewart | Jan. 13, 1942 |
| 2,312,272 | Stacey | Feb. 23, 1943 |
| 2,433,981 | Buck | Jan. 6, 1948 |
| 2,664,808 | Peterson | Jan. 5, 1954 |